United States Patent [19]

Hirota et al.

[11] Patent Number: 5,125,949
[45] Date of Patent: Jun. 30, 1992

[54] MOLD FOR PRODUCING GLASS ARTICLES

[75] Inventors: Shinichiro Hirota, Hachioji; Hiroyuki Sawada; Yasuo Kusumi, both of Akishima, all of Japan

[73] Assignee: Hoya Corporation, Tokyo, Japan

[21] Appl. No.: 622,288

[22] Filed: Dec. 7, 1990

Related U.S. Application Data

[63] Continuation of Ser. No. 366,441, Jun. 15, 1989, abandoned.

Foreign Application Priority Data

Jun. 21, 1988 [JP] Japan ................. 63-152970

[51] Int. Cl.$^5$ .............. C03B 23/00; C03B 40/00
[52] U.S. Cl. .................. 65/374.13; 65/24; 65/26; 65/374.15; 106/38.9; 106/38.28; 249/134
[58] Field of Search ........... 65/374.15, 374.13, 26, 65/24, 72, 169, 374.1, 374.11; 106/38.9, 38.28, 38.22, 38.27; 249/134; 264/338

[56] References Cited

U.S. PATENT DOCUMENTS

| | | | |
|---|---|---|---|
| 2,141,930 | 12/1938 | Partridge | 65/374.13 |
| 3,844,755 | 10/1974 | Angle | 65/72 |
| 3,900,328 | 8/1975 | Parsons | 65/72 |
| 4,168,961 | 9/1979 | Blair | 65/66 |
| 4,606,750 | 8/1986 | Torii et al. | 65/374.13 |
| 4,721,518 | 1/1988 | Monji | 65/26 |

FOREIGN PATENT DOCUMENTS 3137578  4/1983  Fed. Rep. of Germany ...... 249/134

Primary Examiner—Kenneth M. Schor
Attorney, Agent, or Firm—Nixon & Vanderhye

[57] ABSTRACT

The present invention relates to a mold for producing glass articles comprising a glass-made mold base, an intermediate layer formed by a silicon carbide and/or silicon nitride film, and an uppermost layer formed by a carbon film. Since the mold for producing glass articles exhibits an excellent bonding between the glass-made mold base and the uppermost layer formed by the carbon film, peeling of the uppermost layer can be prevented. Therefore, the function of the uppermost layer as an adhesion-prevention layer against the glass to be molded can be exhibited for a long time, causing an economic advantage since the life of the mold can be lengthened. In addition, since the maximum surface roughness of the working surface of the mold can be reduced and the surface shape accuracy can be maintained, a molded glass article exhibits excellent surface accuracy without optical defects.

7 Claims, 1 Drawing Sheet

MOLD FOR PRODUCING GLASS ARTICLES

This is a continuation of application Ser. No. 07/366,441, filed Jun. 15, 1989, now abandoned.

BACKGROUND OF THE INVENTION

1. Field of the Invention

The present invention relates to a mold for producing glass articles, and, more particularly to a mold with which molded glass articles exhibiting high precision can be obtained without needing any post-treatment such as polishing or the like after the press molding has been completed.

2. Prior Art

A mold for producing glass articles is known which comprises a mold base made of glass with a glass transition temperature higher than the temperature at which the glass to be molded is pressed. A mold made of glass of the type described above is disclosed in Japanese Patent Laid-Open No. 226825/1987 in which an adhesion-prevention layer made of a carbon film is formed on the glass-made mold base thereof for the purpose of preventing the glass to be molded from adhering to the mold.

The carbon film serving as the adhesion-prevention layer in the glass mold disclosed in Japanese Patent Laid-Open No. 226825/1987 is coated on the surface of the glass-made mold base by a vacuum evaporation method, sputtering method, ion-plating method or the like. The inventors have found in fact that the following problems arise with the method in which the surface of the glass-made mold base is coated with such a carbon layer, since the adhesive force of the carbon film to the glass-made mold base is insufficient, causing this carbon film to be separated with time elapsed.

(a) The carbon film cannot maintain its function as the adhesion-prevention layer for a long time. Therefore, the life of the mold is too short.

(b) An excessive rough surface can be generated in the surface of the mold, causing the accuracy of the shape to deteriorate. Therefore, desired molded glass articles exhibiting excellent precision and satisfactory optical characteristics cannot be obtained.

SUMMARY OF THE INVENTION

To this end, an object of the present invention is to provide a mold for producing glass articles capable of overcoming the above-described problems (a) and (b) by means of improving the adhesion force of the carbon film to the mold base, thereby protecting the carbon film from peeling.

The mold for producing glass articles according to the present invention comprises:

a glass-made mold base which contains silicon dioxide as a main component and has a working surface which corresponds to the shape of the glass article to be produced;

an intermediate layer disposed at least on the working surface of the glass-made mold base and formed by silicon carbide and/or silicon nitride film; and an uppermost layer disposed on the intermediate layer and formed of a carbon film.

DETAILED DESCRIPTION OF THE PREFERRED EMBODIMENTS

Figure 1:
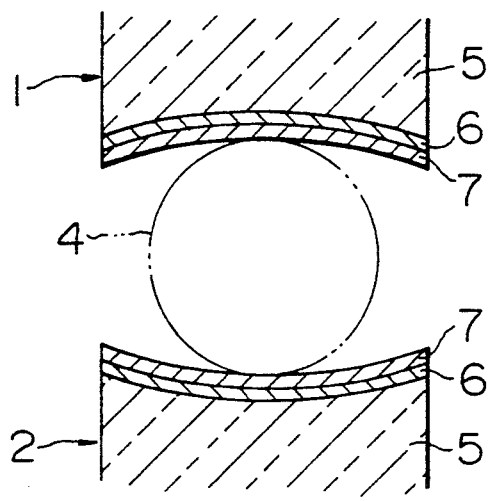
FIG. 1 is a partial view of a mold for producing glass articles according to the present invention.

A mold for producing glass articles according to the present invention employs a glass-made mold base. This glass-made mold base is characterized in that: (1) silicon dioxide serves as the main component; (2) the working surface thereof has a shape corresponding to the shape of the glass articles to be molded.

Glass capable of meeting (1) above is exemplified by quartz glass, and glass which contains silicon dioxide preferably in an amount of 47 to 68 wt % as the first component and aluminum oxide preferably in an amount of 6 to 23 wt % as the second component. The latter glass which contains, as the essential components, silicon dioxide and aluminum oxide can contain at least one component selected from a group consisting of zinc oxide preferably in an amount of 19 wt % or less, magnesium oxide preferably in an amount of 18 wt % or less, boric oxide preferably in an amount of 13 wt % or less. In addition, the same can contain a slight amount of calcium oxide, strontium oxide, barium oxide, lead oxide, alkali metal oxide, and fluorine (fluoride ion).

The glass transition temperature of the quartz glass is substantially 1200° C. and the thermal expansion coefficient of the same is $5 \times 10^{-7}/°C.$, and the glass transition temperature of the glass containing silicon dioxide and aluminum oxide as the essential components is 600° to 800° C. and the thermal expansion coefficient of the same is $30 \times 10^{-7}$ to $60 \times 10^{-7}/°C.$ As can be seen from this, since both types of glass display a high glass transition temperature and a reduced thermal expansion coefficient, they can suitably be used as the materials for the mold for producing glass articles.

The glass-made mold base capable of meeting (2) above and having the shape thereof which can correspond to the contour of the glass articles to be molded can be formed by cold-working of the glass which is the material for the mold base. In the case of thermally softenable glass, such as glass of the type described above which contains silicon dioxide and aluminum oxide as the essential components thereof, it is preferable to form a glass-made mold base in such a manner that the thermally softened glass is placed in a master mold having a predetermined shape and thereafter press-molded. The reason for this is that according to this method, only the master mold is required to be precisely machined, and a multiplicity of mold bases having a predetermined shape can be manufactured cheaply. The overall body of the mold base does not need to be made by the press-molding as described above. The glass-made mold base may be obtained by manufacturing only a portion which serves as the working surface of the mold, by this press-molding method, and coupling the thus-manufactured portion and the other portion of the mold base (it may be made of glass or may be made of materials other than glass).

The mold for producing glass articles according to the present invention is arranged in such a manner that an intermediate layer made of silicon carbide and/or silicon nitride film is formed at least on the working surface of the glass-made mold base. The reason why the silicon carbide and/or silicon nitride film is called an "intermediate layer" is that an uppermost layer made of a carbon film is formed on this intermediate layer for the purpose of preventing the glass to be molded from adhering to the mold. As a result of examinations performed by the inventors, this intermediate layer will improve the bonding between the glass-made mold base and the uppermost layer so that this uppermost layer is protected from peeling. It leads to the following technical effects:

(A) The uppermost layer can exhibit its function as the adhesion-prevention layer for a long time, and the life of the mold can be lengthened. As a result, an economical effect can be obtained.

(B) The maximum surface roughness of the working surface of the mold can be reduced and the contour accuracy can be secured. As a result, desired molded glass articles exhibiting high accuracy and excellent optical characteristics can be obtained.

It is preferable for this intermediate layer to have the thickness of 1 μm or less, in general.

This intermediate layer made of silicon carbide and/or silicon nitride film can be prepared by film forming methods such as sputtering method, ion-plating method, plasma CVD method, vacuum evaporation method, and the like.

When the intermediate layer made of silicon carbide is prepared by the sputtering method, it is preferable that this sputtering method is performed such that the sputter targets and the sputter gases are combined under conditions that the temperature of the mold base is 250° to 600° C., the RF power density is 3 to 15 W/cm$^2$, and the degree of vacuum at the sputtering is $5 \times 10^{-4}$ to $5 \times 10^{-1}$ torr.

| Combinations | Targets | Gases |
| --- | --- | --- |
| (1) | SiC | Ar or (Ar + H$_2$) |
| (2) | (SiC + C) | Ar or (Ar + H$_2$) |
| (3) | Si | (CH$_4$ + Ar) |

When the intermediate layer made of silicon nitride is prepared by the sputtering method, it is preferable that this sputtering method is performed such that the sputter targets and the sputter gases are combined as follows under conditions that the temperature of the mold base is 250° to 600° C., the RF power density is 3 to 15 W/cm$^2$, the degree of vacuum at the sputtering is $5 \times 10^{-4}$ to $5 \times 10^{-1}$ torr.

| Combinations | Targets | Gases |
| --- | --- | --- |
| (1) | Si$_3$N$_4$ | Ar or (Ar + N$_2$) |
| (2) | Si | N$_2$ or (Ar + N$_2$) |

When the intermediate layer made of silicon carbide film is prepared by the ion-plating method, it is preferable that the silicon carbide film is deposited on the mold base, which has been heated to 250° to 600° C., in such a manner that the Si ingot is fused and evaporated by electron beams or the like, and then the thus-evaporated Si is activated by being passed through a glow-discharged atmosphere with a degree of vacuum substantially $10^{-2}$ torr, consisting of a hydrocarbon gas such a CH4 gas or the like or a mixture of this hydrocarbon gas with Ar gas. As an alternative to this glow-discharging, the gas and the evaporated metal may be ionized by high frequency wave.

When the intermediate layer made of the silicon nitride film is prepared by the ion-plating method, it is preferable that the silicon nitride film is deposited on the mold base, which has been heated to 250° to 600° C., in such a manner that the Si ingot is fused and evaporated by electron beams or the like, and then the thus-evaporated Si is activated by being passed through a glow-discharged atmosphere with a degree of vacuum substantially $10^{-2}$ torr, consisting of N2 gas or a mixture of this N2 gas with Ar gas. As an alternative to this glow-discharging, the gas and the evaporated metal may be ionized by high frequency wave.

When the intermediate layer made of the silicon carbide film is prepared by the plasma CVD method, the DC plasma CVD, the RF plasma CVD, the microwave plasma CVD methods and the like can be effectively employed. It is preferable that the silicon carbide film is deposited on the mold base by using a gas such as silicon tetrachloride, propane and hydrogen under conditions that the temperature of the mold base is 700° to 900° C. and the pressure is from 0.1 to 300 torr.

When the intermediate layer made of the silicon nitride film is prepared by the plasma CVD method, the DC plasma CVD, the RF plasma CVD, the microwave plasma CVD methods and the like can also be effectively employed. It is preferable that the silicon nitride film is deposited on the mold base by using a gas such as silicon tetrachloride, ammonia and hydrogen under conditions that the temperature of the mold base is 700° to 900° C. and the pressure is from 0.1 to 10 torr.

When the intermediate layer made of the silicon carbide film is prepared by the vacuum evaporation method, it is preferable that the silicon carbide is deposited on the surface of the confronting mold base after silicon carbide has been evaporated by a CO$_2$ laser beam with a power density of substantially $10^4$ W/cm$^2$ applied in the tangent direction to the outer surface of a rotating sintered silicon carbide within a chamber whose pressure has been reduced to substantially $10^{-4}$ torr. The temperature of the mold base is 250° to 600° C. Alternatively, a method can be employed in which a sintered silicon carbide tablet in a crucible is evaporated by electron beams to deposit on the mold base which has been heated to 250° to 600° C.

When the intermediate layer made of the silicon nitride film is prepared by the vacuum evaporation method, it is preferable that the silicon nitride is deposited on the surface of the confronting mold base after silicon carbide has been evaporated by CO$_2$ laser beam with a power density of substantially $10^4$ W/cm$^2$ applied in the tangent direction to the outer surface of a rotating sintered silicon nitride within a chamber whose pressure has been reduced to substantially $10^{-4}$ torr. The temperature of the mold base is 250° to 600° C. Alternatively, a method can be employed in which a sintered silicon nitride tablet in a crucible is evaporated by electron beams to deposit on the mold base which has been heated to 250° to 600° C.

This intermediate layer may be formed by a mixture consisting of silicon carbide and silicon nitride. Alternatively, the intermediate layer may be formed such that a part thereof is formed by silicon carbide film and the remaining part is formed by the silicon nitride film.

The mold for producing glass articles according to the present invention is arranged such that an uppermost layer made of a carbon film serving as the adhesion-prevention layer against the glass to be molded is formed on the above-described intermediate layer. It is preferable that the thickness of this uppermost layer is 1 μm or less.

The carbon film forming this uppermost layer is prepared by the sputtering method, the plasma CVD method, the CVD method, the vacuum evaporation method, the ion-plating method or the like.

When the carbon film is formed by the sputtering method, it is preferable that the sputtering is performed by using an inert gas such as Ar as a sputter gas and a graphite as a sputter target under conditions that the temperature of the base is 250° to 600° C., the RF power density 5 to 15 W/cm$^2$, the degree of vacuum at the sputtering $5 \times 10^{-4}$ to $5 \times 10^{-1}$ torr.

When the carbon film is prepared by the microwave plasma CVD method, it is preferable that this method is performed by using methane gas and hydrogen gas under conditions that the temperature of the base is 650° to 1000° C., the microwave power 200 W to 1 KW, and the gas pressure of $10^{-2}$ to 600 torr.

When the carbon film is formed by the vacuum evaporation method, it is preferable that carbon film is deposited by evaporating a carbon rod in a vacuum by means of an arc discharging.

When the carbon film is formed by the ion-plating method, it is preferable that benzene gas is ionized.

The mold for producing glass articles comprises a cope (upper mold portion), a drag (lower mold portion), and a sleeve (guide mold portion) for slidably accommodating the cope and drag. Those to be formed by the glass-made mold base, the intermediate layer, and the outermost layer are the cope and the drag, while the sleeve may be made of a usual material such as sintered silicon carbide or the like. The overall structure of the cope and the drag does not need to be designed to be a triple-layered structure. It may be designed such that only the working surface is arranged to be the triple-layered structure.

Alternatively, a structure may be employed which is arranged such that the intermediate layer of either the cope or the drag is made of the silicon carbide film and another intermediate layer is made of the silicon nitride film.

The mold for producing glass articles according to the present invention is arranged such that an intermediate layer made of silicon carbide and/or silicon nitride is interposed between a glass-made mold base and an outermost layer made of a carbon film. Since the thus-formed intermediate layer has an affinity to both the glass-made mold base and the outermost layer made of the carbon film, the bonding between the glass-made mold base and the outermost layer made of the carbon film can be significantly improved.

Then, Examples of the present invention will be described below.

EXAMPLE 1

Figure 2:
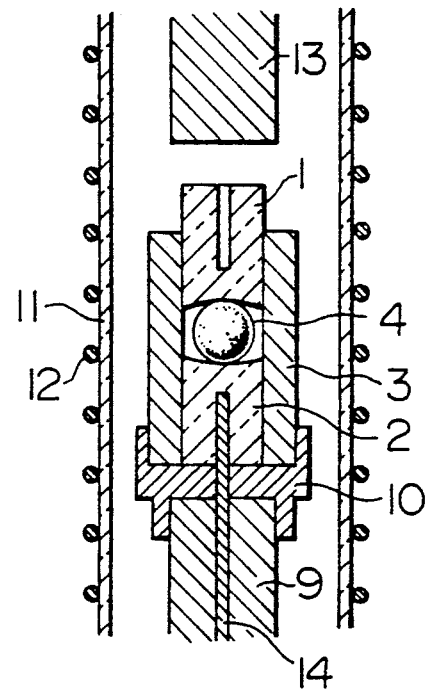
FIG. 2 is a schematic view which illustrates a press-molding apparatus including the mold according to the present invention.

An example of an apparatus for producing glass articles including a mold according to the present invention is shown in FIG. 2. Referring to FIG. 2, the mold comprises a cope 1, a drag 2, and a sleeve 3, wherein the cope 1 and the drag 2 are slidably accommodated within the sleeve 3 and a glass preform 4 to be molded is positioned between the cope 1 and the drag 2.

As shown in FIG. 1, each of the cope 1 and the drag 2 is arranged such that (i) an intermediate layer 6 made of a silicon carbide film is formed in the portion which corresponds to the shape of a glass article to be molded and (ii) an outermost layer 7 made of a carbon film serving as an adhesion-prevention layer against the glass to be molded is formed on this intermediate layer 6. As this glass-made mold base 5, there is used a glass-made mold base having an optical mirror surface, which was prepared by precisely machining a material glass (a glass transition temperature of 690° C., and a thermal expansion coefficient of $38 \times 10^{-7}/°C$.) with an outer diameter of substantially 14 mm and substantially 7 mm in thickness, this material glass consisting of 57.0 wt % of SiO$_2$, 16.0 wt % of Al$_2$O$_3$, 6.0 wt % of ZnO, 9.0 wt % of MgO, 7.0 wt % of B$_2$O$_3$, 1.0 wt % of Na$_2$O, 1.0 wt % of CaO, 1.0 wt % of BaO, 1.0 wt % of PbO, and 1.0 wt % of K$_2$O. The intermediate layer 6 made of the silicon carbide film on this mold base 5 was formed by the sputtering method under the following conditions. The film thickness thereof is 1000 Å.

| Sputtering conditions for forming the intermediate layer 6 | |
| --- | --- |
| Temperature of the mold base | 300° C. |
| RF power density | 5 W/cm$^2$ |
| Degree of vacuum | $5 \times 10^{-3}$ torr |
| Target | SiC |
| Sputter gas | Ar |

The outermost layer 7 on this intermediate layer 6 was formed by the sputtering method under the following conditions. The film thickness thereof is 500 Å.

| Sputtering conditions for forming the outermost layer 7 | |
| --- | --- |
| Temperature of the mold base | 300° C. |
| RF power density | 9 W/cm$^2$ |
| Degree of vacuum | $5 \times 10^{-3}$ torr |
| Target | C |
| Sputter gas | Ar |

Then a mold was formed by using the above-described triple-layered cope 1 and drag 2 as well as the sleeve 3 made of sintered silicon carbide. Using the mold thus formed, press-molding of glass is conducted as follows. That is, a glass preform 4 of optical glass SF15 (glass transition temperature 445° C., thermal expansion coefficient of $82 \times 10^{-7}/°C$., and refractive index nd 1. 70) containing a large amount of PbO was placed in the mold. The mold was supported on a support rod 9 with a support table 10. The thus-placed glass preform 4 was heated in a nitrogen atmosphere by a heater 12 wound to a quartz tube 11. Then a push rod 13 was lowered to press the glass preform 4 under pressure of 50 kg/cm$^2$ for 30 seconds. Then, the applied pressure was released and the obtained molded glass article was gradually cooled down to the above-described glass transition temperature while maintaining contact of the molded glass article with the cope 1 and the drag 2. Then, the temperature was rapidly lowered to a room temperature or its vicinity, and this molded glass article was taken out from the mold.

The thus-obtained molded glass article was a lens exhibiting precise surfaces to which the surface shape of the cope and the drag have been transferred intact. In addition, no adhesion of glass to the mold was generated and no optical defect detected.

When the above-described molding operation was continued, a slight rough surface was observed in the outermost layer at the 500-th operation. However, it was found that the mold was able to be used 1000 times. After completing 1000 molding operations, the carbon film of the uppermost layer was removed by an oxygen plasma ashing method, the most outer layer of the intermediate layer was inverse-sputtered, and a fresh outermost layer is formed to obtain a reformed mold. Then thus-reformed mold was subjected to the next press-molding operations.

EXAMPLE 2

As a material for the mold base, a glass (glass transition temperature of 730° C., and thermal expansion coefficient of $43 \times 10^{-7}$/°C.) composed by 57.0 wt % $SiO_2$, 12.0 wt % of $Al_2O_3$, 10.0 wt % of ZnO, 6.0 wt % of MgO, 10.0 wt % of CaO, and 5.0 wt % of PbO was used. This glass was placed in a master mold having a desired surface shape, while it was softened by heat, and it was press-molded in an inert gas ($N_2$) atmosphere at the temperature of 850° C. and a pressure of 50 kg/cm² for 30 seconds. As a result, the mold base 5 for the cope 1 and the drag 2 was obtained.

Then, the intermediate layer 6 made of silicon carbide film of 500 Å was formed on this mold base 5 by the ion-plating method under the following conditions.

| Ion-plating conditions for forming the intermediate layer 6 | |
|---|---|
| Temperature of the mold base | 500° C. |
| Metal to be evaporated | Si |
| Degree of vacuum | $5 \times 10^{-2}$ torr |
| Gas to be reacted | $CH_4$ + Ar |
| Electron beam | Power of 10 KV and 400 to 450 mA |

Furthermore, the outermost layer 7 made of a carbon film of 1000 Å was formed on this intermediate layer 6 by the microwave plasma CVD method under the following conditions.

| Microwave plasma CVD conditions for forming the outermost layer 7 | |
|---|---|
| Temperature of the mold base | 700° C. |
| Gas | Methane + hydrogen (total 100 cc/min) |
| Methane concentration ($CH_4/CH_4 + H_2$) | 8 mol % |
| Microwave power | 500 W |
| Reaction time | 90 minutes |

A mold was assembled by using the thus-obtained cope 1 and the drag 2 comprising the mold base 5, the intermediate layer 6 and the outermost layer 7. By using thus obtained mold, the press-molding of glass was conducted. As a result, the mold did not display any change even after 3000 times of operations, and press-molded glass articles having excellent surface precision were obtained.

EXAMPLE 3

As the material for the mold base, quartz glass (glass transition temperature of about 1200° C.) was employed. This quartz glass was cold-worked so that the mold base 5 having the same shape as that of the mold base 5 according to Example 1 was formed.

Then, the intermediate layer 6 made of silicon nitride film of 3000 Å was formed on this mold base 5 by the plasma CVD method under the following conditions:

| Plasma CVD conditions for forming the intermediate layer 6 | |
|---|---|
| Gas | silicon tetrachloride |
| Reaction temperature | 800° C. |
| Reaction time | 20 minutes |

The outermost layer 7 made of carbon film of 3000 Å was formed on this intermediate layer 6 by the microwave plasma CVD method under the following conditions.

| Microwave plasma CVD conditions for forming the outermost layer 7 | |
|---|---|
| Temperature of the mold base | 900° C. |
| Gas | methane + hydrogen (total 150 cc/min) |
| Methane concentration | ($CH_4/CH_4 + H_2$) 15 mol % |
| Microwave power | 550 W |
| Reaction time | 40 minutes |

A mold was assembled by using the thus-obtained cope 1 and drag 2 comprising the mold base 5, the intermediate layer 6, and the outermost layer 7, and then the press-molding of glass was performed. As a result, similar results to those obtained in Example 2 were obtained.

EXAMPLE 4

As the material for the mold base, quartz glass was used. The intermediate layer was formed in the similar conditions to those in Example 1 and then the outermost layer similar to that obtained in Example 3 was formed. The press-molding of glass was performed. As a result, similar results to those obtained in Example 2 were obtained.

As described above, the mold for producing glass articles according to the present invention exhibits an excellent bonding between the glass-made mold base and the outermost layer made of the carbon film. Therefore, any peeling of this outermost layer can be prevented so that this uppermost layer can, for a long time, exhibit its function of serving as the adhesion-prevention layer against the glass to be molded. As a result, an economical advantage can be obtained since the life of the mold can be lengthened. Furthermore, since the maximum surface roughness of the working surface of the mold can be reduced and its shape accuracy can be secured, the molded glass articles having excellent surface accuracy and no optical defect can be obtained.

We claim:

1. A mold for producing glass articles comprising a pair of mold members, each member being made of:
   a mold base made of glass containing silicon dioxide as a main ingredient, said mold base having a working surface having a shape which is inverse to the glass articles to be produced, said mold base being a means to contact and shape a glass preform;
   an intermediate layer directly disposed at least on and adhered to said working surface of the mold base, said intermediate layer consisting of a film of silicon carbide, silicon nitride or both silicon carbide and silicon nitride; and
   an outermost layer directly disposed on and adhered to said intermediate layer, said outermost layer consisting of a carbon film having a thickness of at most 1 μm and at least sufficient thickness to prevent said glass articles from adhering to said mold.

2. A mold for producing glass articles according to claim 1, wherein glass forming said mold base comprises quartz glass or glass which contains, as the essential components, silicon dioxide and aluminum oxide.

3. A mold for producing glass articles according to claim 1, wherein said mold base is formed by cold working of glass which is the material for said mold base, so as to have a surface shape corresponding to the shape of the molded glass articles.

4. A mold for producing glass articles according to claim 1, wherein said mold base is formed by press-molding thermally softened glass which is the material for the mold base, after placing said glass into a master mold having a predetermined shape.

5. A mold for producing glass articles according to claim 1, wherein the thickness of said intermediate layer is 1 μm or less.

6. A mold for producing glass articles according to claim 1, wherein said intermediate layer made of said silicon carbide and/or silicon nitride film is formed by film-forming method selected from a group consisting of a sputtering method, an ion-plating method, a plasma CVD method, and a vacuum evaporation method.

7. A mold for producing glass articles according to claim 1, wherein said outermost layer made of the carbon film is formed by film-forming method selected from a group consisting of a sputtering method, a plasma CVD method, a CVD method, a vacuum evaporation method, and an ion-plating method.

* * * * *